United States Patent
Lee

(10) Patent No.: US 6,596,160 B2
(45) Date of Patent: Jul. 22, 2003

(54) PERIODIC OZONE TREATMENT SYSTEM FOR A SHOWERING TOWER TYPE WATER COOLING SYSTEM

(76) Inventor: Minshiou Lee, 8F-2, No.341, Chung-Hsiao E. Rd., Sec. 4, Taipei (TW)

( * ) Notice: Subject to any disclaimer, the term of this patent is extended or adjusted under 35 U.S.C. 154(b) by 0 days.

(21) Appl. No.: 09/993,556

(22) Filed: Nov. 27, 2001

(65) Prior Publication Data

US 2003/0098268 A1 May 29, 2003

(51) Int. Cl.$^7$ .............................. C02F 1/78; B01D 24/46
(52) U.S. Cl. ................. 210/167; 210/181; 210/192; 210/206; 210/259; 210/275; 210/760; 210/765; 210/766; 210/792
(58) Field of Search .................. 210/167, 175, 210/177, 181, 138, 182, 192, 205, 206, 252, 259, 263, 275, 277, 760, 764, 765, 766, 792, 774

(56) References Cited

U.S. PATENT DOCUMENTS

| | | | | |
|---|---|---|---|---|
| 4,172,786 A | * | 10/1979 | Frosch et al. | 210/696 |
| 4,177,143 A | * | 12/1979 | Myers | 210/793 |
| 5,106,497 A | * | 4/1992 | Finnegan | 210/192 |
| 5,114,576 A | * | 5/1992 | Ditzler et al. | 210/195.1 |
| 5,145,585 A | * | 9/1992 | Coke | 210/695 |
| 5,186,841 A | * | 2/1993 | Schick | 210/760 |
| 5,252,300 A | * | 10/1993 | Hinchliffe | 422/186.08 |
| 5,415,783 A | * | 5/1995 | Johnson et al. | 210/699 |
| 5,622,632 A | * | 4/1997 | Gallup | 210/669 |
| 5,787,537 A | * | 8/1998 | Mannillo | 8/158 |
| 5,879,565 A | * | 3/1999 | Kusmierz et al. | 210/757 |
| 6,086,772 A | * | 7/2000 | Tanimura et al. | 210/760 |
| 6,173,527 B1 | * | 1/2001 | Pryor | 47/58.1 R |

FOREIGN PATENT DOCUMENTS

| | | | |
|---|---|---|---|
| JP | 61-150708 | * | 7/1986 |
| JP | 11-33558 | * | 2/1999 |
| JP | 2000-157985 | * | 6/2000 |

* cited by examiner

Primary Examiner—Fred Prince
(74) Attorney, Agent, or Firm—Rosenberg, Klein & Lee

(57) ABSTRACT

A periodic ozone treatment system for a showering tower type water cooling system worked once daily for a period of 10~30 minutes essentially comprises:

an ozone dissolving tank to prepare high density ozone solution therein and periodically fed to the cooling system from a top of the showering tower automatically;

a bypass piping connected from a heated water recycling pipe after a heat exchanging in a main functional heat exchanger to a sand filter to shift recycling water for washing the sand in the filter by a reverse osmosis operation during the period while the ozone treatment system is working; and an ozone decomposition reactor disposed at a front of heat exchanger free from corrosion.

8 Claims, 3 Drawing Sheets

PERIODIC OZONE TREATMENT SYSTEM FOR A SHOWERING TOWER TYPE WATER COOLING SYSTEM

FIELD OF THE INVENTION

The present invention relates to an ozone treatment system for a water cooling system especially relates to a periodic high density ozone treatment system for a showering tower type water cooling system of a refrigerating or an air conditioning apparatus which supplies high density ozone solution periodically to the circulating water of the cooling system from a top of the showering tower for sterilization, algae extermination and stink removing.

BACKGROUND OF THE INVENTION

While the showering tower type water cooling system is commonly used in a refrigerating and an air conditioning system or other heat exchanges of industrial installation there will be a problem of sterilization occurred due to that the circulating water has been exposed in open environment during showering, may having germs, algae even small insects grown and multiplied therein.

A chloride system has been popularly used for sterilization cooling water, but the chloride is poisonous and may coursed a cancor; so that, the WHO (World Healthy Organization) made a formal call recently for avoiding to use chlorine. Therefore an alternative sterilization system should be researched and developed.

Figure 1:
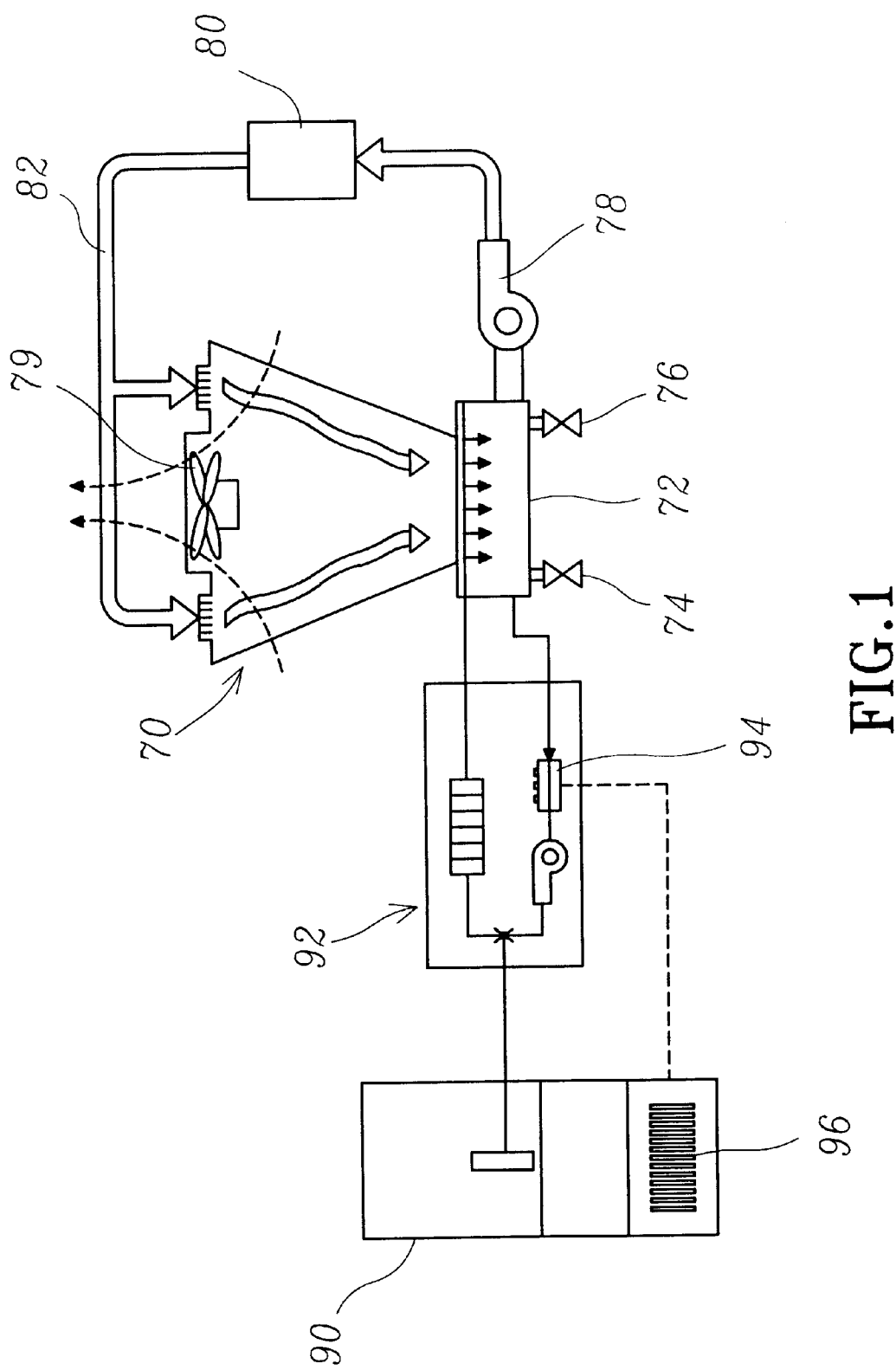

FIG. 1 shows an ozone treatment system exposed on Federal Technology Alerts, in which a water showering tower 70 having a fan system 79 to produce wind upwardly into the open air for cooling the showering water therefore, a recycling water fed back piping 82 delivering heated water from a main functional heat exchanger 80 to the showering tower 70 from a periphery spacing outside the fan 79 at a top, and an ozone generator 90 to produce ozone and guided into a showering water collecting pan 72 under the showering tower 70 through a contector 92, a sensor 94 in the contector 92 to detect the density of ozone solution in the collecting pan 72, and been controlled a predetermined density of ozone solution by a CPU 96, the collecting pan 72 having a make-up water inlet value 74 and a blow down water exhaust value 76, a water pump 78 for pumping the cooled water from the collecting pan 72 to the main heat exchanger 80 to cooling the medium in a medium coil (not shown) therefore.

The aforesaid prior art of an ozone treatment system may be worked for a water cooling system sterilization, however there shall has some disadvantages as follows:

(1) The ozone treatment system is started from the water collecting pan 72 to neglect the showering tower 70. But, infect, the showering tower is a first warm bed for germs growing.

(2) The daily cost of a permanent supply system of ozone in a certain high density is very high. In fact, germs need a term around 3 days for growing, therefor a permanent supply ozone system is a kind of waste.

(3) The ozone solution circulated continuously to the heat exchanger courses the metal part in the heat exchanger. Such as cooling fins and medium coil tubes getting corrosion and damaged rapidly by the new born oxide from ozone.

(4) The ozone solution is not homogenized, therefore the efficiency of sterilization well be not as high as expected.

SUMMARY OF THE INVENTION

The present invention has overcome all the aforesaid drawbacks of the prior art by using a periodic high density ozone treatment system.

Therefore a main object of the present invention is to provide an ozone treatment system started from a top of a showering tower.

Another major object is to provide an ozone treatment system having an operating period of 10~30 minutes, once daily, covering only 1%~2% of a permanent supply system, therefore saving a great amount of cost.

Still another object is to provide an ozone treatment system having an ozone decomposition reactor which decomposes the ozone from water before the water circulated into the heat exchanger to prevent the metal parts in the heat exchanger free from corrosion due to the new born oxide from ozone.

Still another object is to provide an ozone treatment system which having a centrifugal homogenizer disposed in a ozone dissolving tank to homogenize the ozone solution for increasing the efficiency of sterilization therefore.

In short, the present invention is a high efficiency and economic ozone treatment system therefore.

BRIEF INTRODUCTION OF DRAWINGS (1) FIG. 1 shows a prior art of a permanent ozone treatment system exposed on Federal Technology Alert.

Figure 2:
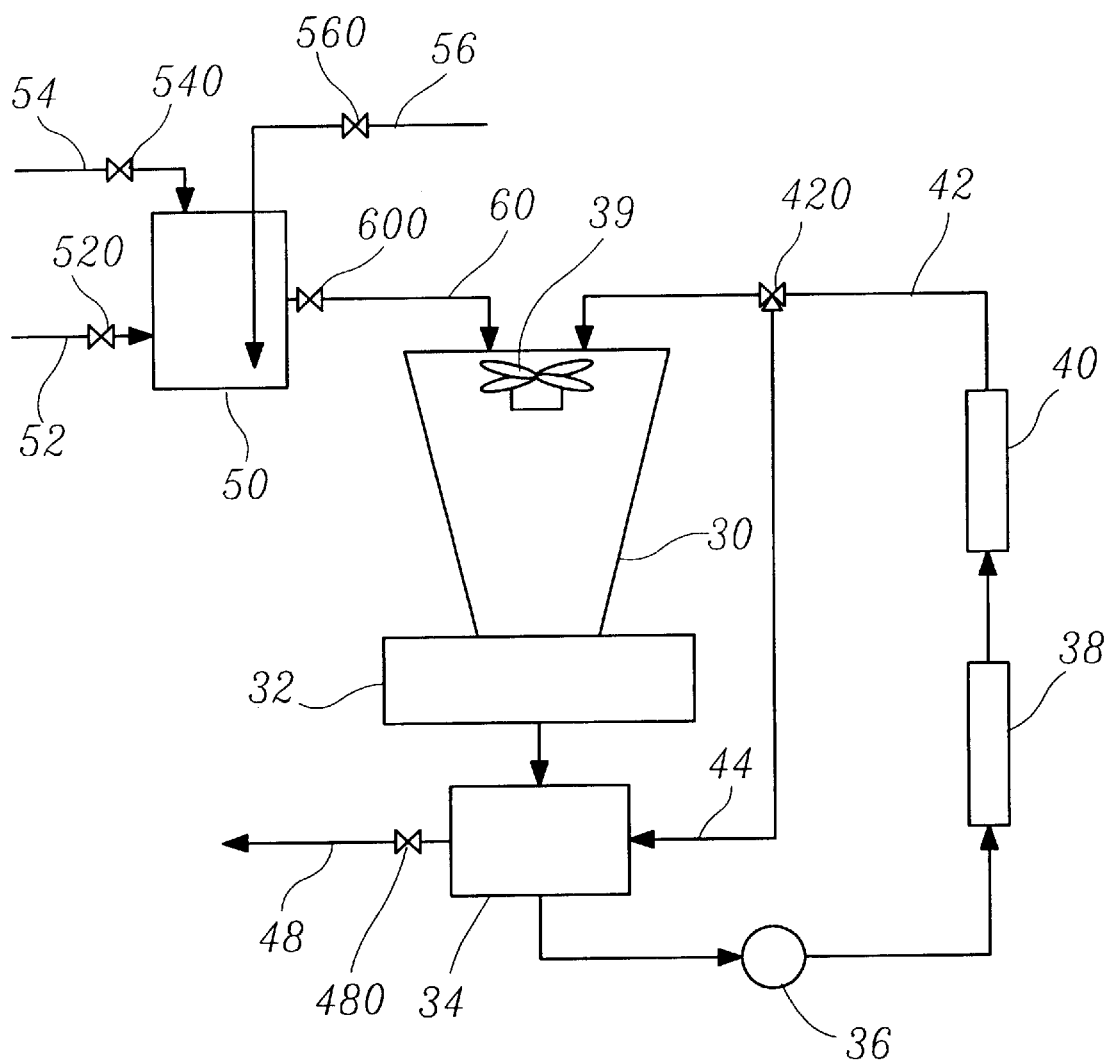

(2) FIG. 2 shows a preferable embodiment of a periodic high density ozone treatment system of the present invention.

Figure 3:
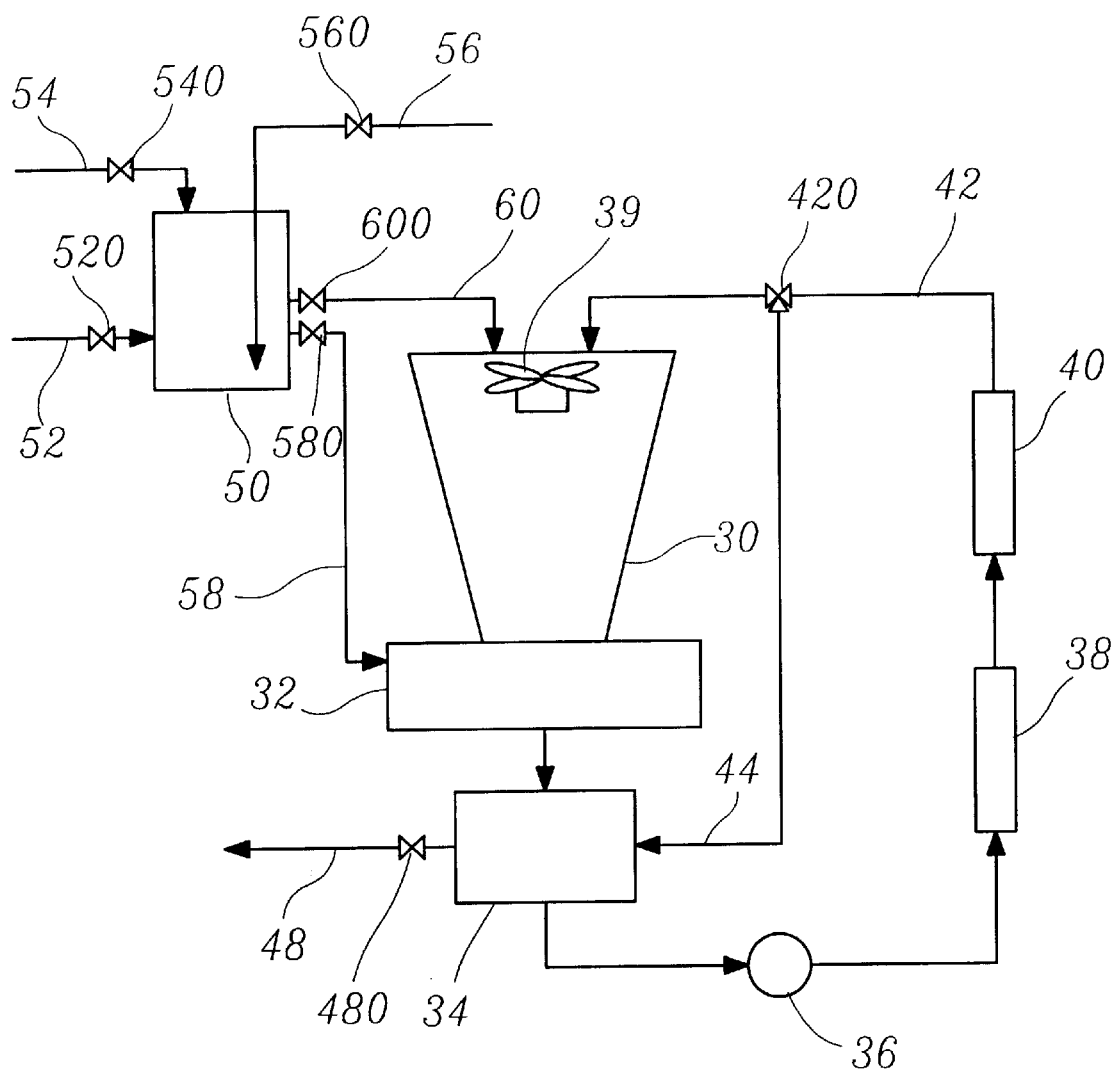

(3) FIG. 3 shows another preferable embodiment of a periodic high density ozone treatment system of the present invention which has an additional low dencity ozone supply piping alternatively operated therewith.

DETAILED DESCRIPTION

Referring to FIG. 2, an ozone treatment system for a showering tower type water cooling system comprise an ozone dissolving tank 50 having an ozone supply tube 56 guiding ozone from an ozone generator (not shown) into the tank 50, a fresh make-up water supply pipe 54, a neutralization agent feeding pipe 52 respectively having an electromagnetic valve 560, 540 and 520 disposed to accordinary pipe 56, 54 and 52, and automatically controlled the feeding rate and the period of operating by a CPU (not shown), a centrifuge (not shown) disposed therein to homogenize the ozone solution to a high density of 5–10 PPM, an ozone solution feeding pipe 60 having an electromagnetic valve 600 therewith to feed ozone solution to a showering cooling tower 30 from a top thereof for sterilization, germs killing, algae ruination and stink removing.

A showering cooling tower 30 having a fan system 39 disposed at a top center thereof to provide an upward wind for cooling the showering water therefore.

A showering water collecting pan 32 disposed under the showering tower 30 for receiving the showering water therein.

A sand bath filter 34 for filtering to flit the water delivered from the water collecting pan 32 having a blowdown water drain port 48 controlled by an electromagnetic valve 480 for periodically dispatching the sewage water during the period when the ozone treatment system is operating.

A water pump 36 to pumping water to circulate for the cooling system.

An ozone decomposition reactor 38 disposed ahead of the main functional heat exchanger 40 to prevent the metal parts in the heat exchanger 40 (such as cooling fins and coil tubes) free from corrosion due to the new-born oxide from ozone.

A recycling water feed back pipe 42 for guiding the heated water after a heat exchange in the heat exchanger 40 back to a top of the showering tower 30.

A bypass piping 44 connected from an electromagnetic shifting valve 420 on the recycling water pipe 42 to the sand bath filter 34 to shift the recycling water to the filter 34 for a reverse osmosis action during the period of the high density ozone treatment system is running.

Referring to FIG. 3 there is another embodiment of the present invention suitable for a bad environment which the germs are easily getting grow. In which an additional low density ozone supply piping 58 and an electromagnetic valve 580 is devised from the ozone dissolving tank 50 connected to the water collecting pan 32 directly to alternatively provide a low density ozone solution for sterilization during an ordinal term except the period of the high density ozone treatment system is running.

In which the density of the ozone solution is arrange to 0.5~2 PPM. Therefore the cost is still as low as only 10%~20% of the prior art costs.

What is claimed is:

1. A periodic ozone treatment system for a showering tower type water cooling system comprising:

an ozone dissolving tank to prepare an ozone solution of fresh water and periodically supplying to said cooling system for sterilization, algae extermination and stink removing;

a water showering cooling tower having a fan system for cooling showering water;

a water collecting pan disposed under said showering tower for collecting cool water therein and a sand bath filter disposed following said water collecting pan for removing solid particles and impurities therefrom;

a water pump directly connected to an outlet of said filter for circulating water around said cooling system;

a main functional heat exchanger devised to receive the water delivered from said water pump through an ozone decomposition reactor which said ozone decomposition reactor is to prevent metal parts in said heat exchanger from corroding;

a recycling water pipe to feed heated water after heat exchanging back to an inlet at a top of said showering tower; and a bypass pipe connecting between said recycling pipe of heated water and said sand bath filter for shifting heated recycling water into said filter to clean the sand by a reverse osmosis action during the period which the ozone treatment system is working.

2. The periodic ozone treatment system according to claim 1, wherein said system is operated period of 10~30 minutes by the ozone treatment system.

3. The periodic ozone treatment system according to claim 1, wherein said ozone dissolving tank has a fresh water inlet, an ozone feeding pipe and an inlet of neutralization agent disposed at a top thereof, and further has a centrifuge disposed in said tank for homogeneously dissolving ozone into fresh water to a homogenized high density ozone solution.

4. The periodic ozone treatment system according to claim 1, wherein said ozone solution is set to a preferable density of 5~10 PPM.

5. The periodic ozone treatment system according to claim 1, wherein said ozone solution is periodically fed to said cooling tower from a top thereof and to take place of heated recycling water when the recycling water is shifted to said filter through said bypass piping for cleaning said filter by a reverse osmosis action.

6. The periodic ozone treatment system according to claim 1, wherein said filter has a drain port which will be opened for sewage exhausting during the period of reverse osmosis action.

7. The periodic ozone treatment system according to claim 1 further comprising an additional ozone system which provides an ozone solution from an ozone dissolving tank directly to a water collecting pan through a pipe alternatively operated when the periodic ozone treatment system is not operating in a predetermined manner.

8. The periodic ozone treatment system according to claim 7, wherein said ozone solution from said ozone dissolving tank is set to a preferable density of 0.5~2.0 PPM.

* * * * *